(12) United States Patent
Conforti et al.

(10) Patent No.: US 6,413,562 B2
(45) Date of Patent: Jul. 2, 2002

(54) HEALTHY BREAD CRUMBS

(76) Inventors: George Conforti, 237 Seaman Ave.; Eugene Turner, 49 Arizona Ave., both of Rockville Centre, NY (US) 11570

(*) Notice: Subject to any disclaimer, the term of this patent is extended or adjusted under 35 U.S.C. 154(b) by 0 days.

(21) Appl. No.: 09/925,191

(22) Filed: Aug. 9, 2001

Related U.S. Application Data

(63) Continuation-in-part of application No. 09/558,780, filed on Apr. 26, 2000, now abandoned.

(51) Int. Cl.[7] .......................... A21D 10/00; A21D 13/00
(52) U.S. Cl. .......................... 426/94; 426/549; 426/555; 426/560
(58) Field of Search .......................... 426/94, 549, 555, 426/560

(56) References Cited

U.S. PATENT DOCUMENTS

| | | | | |
|---|---|---|---|---|
| 3,676,148 A | * | 7/1972 | Weese et al. | 99/1 |
| 3,870,803 A | * | 3/1975 | Siems et al. | 426/128 |
| 3,870,806 A | * | 3/1975 | Capossela et al. | 426/152 |
| 4,609,558 A | * | 9/1986 | Giacone et al. | 426/549 |
| 5,175,010 A | * | 12/1992 | Roig et al. | 426/19 |
| 5,458,902 A | * | 10/1995 | Rudel | 426/549 |
| 5,753,286 A | * | 5/1998 | Higgns | 426/92 |
| 5,789,012 A | * | 8/1998 | Slimak | 426/629 |

FOREIGN PATENT DOCUMENTS

| | | | |
|---|---|---|---|
| WO | WO 99/15030 | * | 4/1999 |
| WO | WO 99/15031 | * | 4/1999 |

OTHER PUBLICATIONS

Rodale's Basic Natural Foods Cookbook, Copyright 1984, p. 513 and 528.*
Keto Crumbs—Low Carb Bread Crumbs—A product of Life Services Supplements, Inc. 1996.*
Pillsbury Meal Time Ideas; www.mealtimeidesa.com, copyright 2001 The Pillsbury Company.*
Cook's Thesaurus; www.foodsubs.com/crumbs.html Copyright 2001.*
"Catching Value in Seafood", By Lynn A. Kuntz, Food Product Design, Dec. 1997.*
Texas Crumb and Food Products, www.dasbrot.com/breading.htm, 1975.*
Panko Bread Crumbs, pacificrim–gourmet.com, copyrigt 1999–2001.*

* cited by examiner

Primary Examiner—Nina Bhat
(74) Attorney, Agent, or Firm—Weiss & Weiss PC; Philip M. Weiss

(57) ABSTRACT

The present invention relates to healthy bread crumbs and particularly bread crumbs made from whole wheat flour, rye flour, whole grain flour; low fat and/or baked blue tortilla chips, potato chips and tortilla chips; any type of nuts; pretzels made from whole grain and any type of oat or bran product.

3 Claims, No Drawings

HEALTHY BREAD CRUMBS

RELATED APPLICATION

This present application is Continuation-In-Part of U.S. Ser. No. 09/558,780, filed Apr. 26, 2000, now abandoned

FIELD OF THE INVENTION

The present invention relates to healthy bread crumbs and particularly bread crumbs made from whole wheat flour, rye flour, whole grain flour; low fat and/or baked blue tortilla chips, potato chips, tortilla chips; any type of nuts, pretzels made from whole grains and any type of oat or bran product.

BACKGROUND OF THE INVENTION

When food is eaten and digested it is broken down into glucose. Glucose in the blood stream (blood sugar) needs to be regulated. Too much causes hyperglycemia, too little causes hypoglycemia. The body uses some of the glucose immediately as energy, and stores the excess as glycogen and fat. Glucose is regulated by hormones produced in the pancreas, namely insulin and glucagon. High blood sugar causes insulin to be released. Low blood sugar causes glucagon to be released which in turn releases some of the stored-up glycogen. This process works as long as food is eaten and digested in a slow and steady way. When energy demand by the body is high, glucose (fuel) is released. When the body is resting glycogen is stored either a quick source of energy, or as fat for long term demand. But if an overload of food is eaten without a corresponding increase in activity, turning the glucose into fat is the quickest and easiest way for the body to store the excess. Different foods are digested and turned into glucose at different rates. Factors that influence the speed that foods are converted to glucose include the complexity of their molecular structure. For example, complex carbohydrates break down slower than simple ones. Other factors that can dramatically affect the speed of digestion include fiber content of foods, amount of fat and protein in the foods, and cooking and processing methods.

It is generally recommended that 50–60% of a person's diet be composed of carbohydrates contained in foods of plant origin. When planning a well-balanced diet the majority of foods should be chosen from fruits, vegetables, and whole grains which provide a person with an abundant supply of digestible and nondigestible carbohydrates, as well as vitamins, minerals and phytochemicals which are unique to plant foods.

The digestible carbohydrates include sugar-containing foods such as fruits and sweets, and starch-containing foods such as potatoes, rice, breads and cereals, and pasta. The nondigestible carbohydrates are the dietary fibers. Fiber is that component of a well-balanced diet that resists digestion in the human gastrointestinal tract.

The average American diet contains between 10–15 grams of dietary fiber per day. Although the exact requirement for dietary fiber is not known, the suggested level includes ingestion of between 20–35 grams per day.

U.S. Pat. No. 4,609,558 relates to farinaceous product particles having properties comparable to those of bread crumbs that are produced by continuously mixing the individual components with a leavening agent into a continuous extruder/cooker, extruding the cooked dough, cutting the extruded dough into small lengths, grinding it while still moist and warm into small particles, heating the particles to simultaneously toast and dry same to a desired color, texture and moisture.

U.S. Pat. No. 5,175,010 relates to a process for continuously manufacturing a farinaceous product similar to bread crumbs in texture, shape and taste properties, without fermenting, proofing, loafing, or resting the dough, including the steps of continuously mixing a dry composition including flour, chemical leavening, and minor amounts of dough conditioner, miscellaneous ingredients, and optionally dry yeast with a brew including water, hydrogenated vegetable oil and optionally dry yeast to form a dough.

U.S. Pat. No. 5,458,902 relates to a high protein content bread product. The patent relates to a composition for preparing a bread product containing a grain flour having a wheat protein content between about 17% and about 30% by weight, "low heat" non-fat dry milk solids present in an amount between about 9% and about 100% based on flour weight that is effective to provide a bread product having an additive-free specific volume greater than about 4.0 cc/g, and optionally including "high heat" non-fat dry milk solids to augment the protein and calcium levels of the composition, one or more vegetable gums to improve the loaf volume, shape and structural strength of the bread product, or combinations thereof, wherein the combined percentage of milk solids is less than 100% based on flour weight.

U.S. Pat. No. 5,789,012 relates to flours prepared from white sweet potatoes, cassava, edible aroids, tropical yams, lotus, arrowhead, buckbean, and amaranth, and a variety of different food products prepared from them, are substitutes for wheat and other grains, legumes, milk, eggs and a partial substitute for nuts.

U.S. Pat. No. 3,870,803 relates to an instant stuffing mix. The bread crumb combinations are for white bread crumb: 30–95% by weight white bread crumb and 5–70% by weight whole wheat or corn bread. The preferred ratio is 50–95% white bread to 5–50% whole wheat bread. For whole wheat bread crumbs, the crumbs should be combined with at least 50% by weight of white or corn bread crumb or mixtures thereof. Further Siems defines whole wheat bread as a mixture of bran free flour, white bread and bran containing flour. Siems uses a white bread crumb because the stuffing based on the whole wheat bread crumb tends to be dry and non-cohesive. This undesirable characteristic is overcome by the addition of at least 50% by weight white or corn bread crumb or mixtures thereof to the whole wheat bread crumb.

Most individuals get their share of whole grain fibre in the form of bread. There are no healthy fibers used to make bread crumbs.

The whole wheat breads which are sold in grocery stores do not contain 100% or anything near a majority of whole wheat flour. Wonder light bread contains enriched wheat flour made of flour, barley malt, ferrous sulfate, and B vitamins. An ingredient of the product is whole wheat flour. Freihofer's Split top wheat bread is made from unbleached enriched flour containing wheat flour, malted barley flour, iron, niacin, etc. One of the ingredients is also whole wheat flour. Suzanne Dunaway's Handmade Italian Breads in 90 minutes describes a whole wheat bread which is made of 1 cup of whole wheat flour to 3 ½ to 4 cups of unbleached bread flour.

SUMMARY OF THE INVENTION

The present invention relates to healthy bread crumbs and particularly bread crumbs made from whole wheat flour, rye flour, whole grain flour; low fat and/or baked blue tortilla chips, potato chips and tortilla chips; any type of nuts, pretzels made from whole grain and any type of oat bran product.

It is an object of the present invention to prepare bread crumbs which contain approximately 100% of any one of these grains or products or may be used in any combination with each other or combined with any other products or spices such that the percent of the grains or products is not less than 25%. It is an object of the present invention to prepare bread crumbs where the percent of grains or products should be between approximately 50% to 100%. It is an object of the present invention where the percent of grains or products should be between 75% to 100%. The greater the percentage of grains or products described in the present invention present in the bread crumb, the healthier the bread crumb.

It is an object of the present invention that the bread crumbs are used in combination with other foods to produce other food products.

It is an object of the present invention for the bread crumbs to be made from predominantly whole wheat flour.

It is an object of the present invention for the bread crumbs to be made of flour which is solely whole wheat flour.

It is an object of the present invention to use little or no white flour in the bread crumb.

It is an object of the present invention to assist in reducing cholesterol. It is an object of the present invention to provide a bread crumb which is good for a person's diet.

DETAILED DESCRIPTION OF THE INVENTION

Rye bread has been proven to be effective in killing cancer cells. It has been shown that rye can lessen the risk of breast, prostate and colon cancer. Another result is that rye helps people slim. That is because energy is removed from the body along with fibre, thereby preventing obesity and even helping people shed weight. Rye fibre has numerous good properties. They affect bowel functions, metabolic processes and the quality, amount and composition of intestinal bacteria. They also influence gall acidity. This is especially important, because some gall acids are carcinogens, which means that they help cancer-causing substances to begin the process of attacking the body.

Fibres also influence the body's hormone balance and lower the blood estrogen level, thereby lessening the risk of breast cancer. They dilute toxic substances in the intestines and remove them.

When whole grain rye bread is eaten, the lignin in it provide the raw material from which hormone-like substances, especially enterolactone, is created in a person's intestines. These inhibit the growth of several kinds of cancer cells. Six slices of rye bread a day provide all the fibres the human body needs. To get the same amount from vegetables, a person would have to eat 1.3 kilos of carrots, eight kilos of tomatoes or two kilos of apples.

Studies have shown the benefits of eating a diet with increased levels of fiber include alleviation or prevention of constipation and hemorrhoids, prevention of diseases of the colon such as diverticulosis and cancer, and assistance with weight control. In addition, some clinical research suggests that dietary fiber may play a role in improving blood sugar control and diabetes.

Dietary fiber has been shown in reducing serum cholesterol and may help decrease the incidence of heart disease. Large population studies have documented protection from heart disease from vegetable, fruit and cereal fibers. According to a new study from Harvard University on the eating habits of 75,000 middle aged women with no previous history of heart disease, those who ate the most whole grain (as little as three servings per day) including whole grain breads and cereals, popcorn, oatmeal, wheat germ, brown rice, kasha, and bulgar were one third less likely to suffer a heart attack than those who ate virtually none.

The diseases of modem civilization are strongly associated with the change in diet to one that is deficient in fruits, vegetables and whole grain breads and cereals. Although refined breads and cereals are fortified specific B vitamins, they remain lower in fiber, folate, and vitamin E which have all been shown to lower the risk of heart disease. Taking over the counter dietary supplements is not sufficient because research shows that in addition to fiber, folate and vitamin E, the cardioprotective role of whole grain is also due to its many other phytochemicals and antioxidants such as selenium, lignin, phytoestrogens, isoflavones, and phytic acid which may be lost in the refining process and are not replaced.

The present invention relates to healthy bread crumbs and particularly bread crumbs made from whole wheat flour, rye flour, whole grain flour; low fat and/or baked blue tortilla chips, potato chips and tortilla chips; any type of nuts; pretzels made from whole grain and any type of oat or bran product. These products all have greater nutritional value then traditional white bread crumbs. It is preferable to use whole grain or darker grains to add even greater nutritional value.

In a preferred embodiment, a very small percent or no white or bleached flour is used in the bread crumb. In a preferred embodiment, the bread crumb contains less than 25% white flour. In a most preferred embodiment, the bread crumb contains less than 5% white flour.

The bread crumbs of the present invention may contain 100% of any one of these grains or products or may be used in any combination with each other or combined with any other products or spices such that the percent of the grains or products is not less than 25%. Preferably the percent of grains or products should be between approximately 50% to 100%. It is an object of the present invention where the percent of grains or products should be between 75% to 100%.

The bread crumbs of the present invention will also be available in combination with other foods to produce other food products. For example, the bread crumbs of the present invention can be combined with chopped sundried tomatoes, olive oil and spice to produce a crust. This crust can be used to encrust other foods such as chicken breasts and fish.

The crumb products can also be used in combination with various chopped nuts to produce a product that can also be used to encrust other foods. Some of the crumb products will be used purely for health reasons, while others will be used for variety, taste and texture. These crumb products are different from bread crumbs presently available to the public, which presently has white bread used to produce this end product.

The bread crumbs of the present invention can be prepared in numerous ways known in the art. For instance, the bread crumbs of the present invention can be made by baking bread according to conventional yeast leavening procedures, allowing the bread to stale then comminuting the stale loaf to desired particle size. The time required for staling is normally about 1 to 3 days. The introduction of gas to raise the dough to avoid using any yeast or ferment can also be used. Other methods of manufacturing bread crumbs are described in the prior art references referenced above.

In an embodiment of the present invention the bread crumbs are made from predominantly whole wheat flour. In a further embodiment, the bread crumbs are made from flour which is solely whole wheat flour.

EXAMPLES

Plain Whole Grain Bread Crumb

Ingredients: Whole Wheat Flour, Malted Barley, Salt, Yeast

Tomato and Herbs Whole Grain Bread Crumbs

Ingredients: Whole Wheat Flour, Malted Barley, Salt, Yeast, Tomato Powder, Basil, Tyme and Parsley.

Honey Almond Whole Grain Bread Crumbs

Ingredients: Whole Wheat Flour, Malted Barley, Salt, Yeast, Crushed Almonds, Honey Powder, Fructose and Maltodextrin Cajun Whole Grain Bread Crumbs Ingredients: Whole Wheat Flour, Malted Barley, Salt, Yeast, Onion, Garlic, Chili, Cumin, Tyme, Black Pepper, Paprika, Celery Seed and Cayene.

What is claimed:

1. A bread crumb made from bread comprising flour, said flour consisting essentially of whole wheat flour or rye flour or whole grain flour; said bread crumb optionally comprising low fat or baked blue tortilla chips, potato chips or tortilla chips, nuts whole grain pretzels, oats or bran wherein said bread crumb contains less than 25% white flour.

2. A method of coating food using the bread crumb of claim 1.

3. A bread crumb consisting essentially of whole wheat flour, malted barley, salt and yeast.

* * * * *